United States Patent [19]

Day et al.

[11] Patent Number: 5,239,431
[45] Date of Patent: Aug. 24, 1993

[54] HEAD LIFT LIMITER FOR A DISK DRIVE

[75] Inventors: Clifford K. Day, Meridian; Wayne E. Foote, Eagle; Robert R. Hay; Paul K. Mul, both of Boise, all of Id.

[73] Assignee: Hewlett-Packard Company, Palo Alto, Calif.

[21] Appl. No.: 842,280

[22] Filed: Feb. 26, 1992

[51] Int. Cl.⁵ .................. G11B 17/022; G11B 5/54
[52] U.S. Cl. .................. 360/98.08; 360/105
[58] Field of Search ............ 360/98.07, 98.08, 105, 360/106, 99.12, 135

[56] References Cited

U.S. PATENT DOCUMENTS

| | | | |
|---|---|---|---|
| 4,604,664 | 8/1986 | Barski | 360/99.12 |
| 4,910,625 | 3/1990 | Albrecht et al. | 360/135 |
| 5,006,942 | 4/1991 | Brooks et al. | 360/98.08 |
| 5,027,242 | 6/1991 | Nishida et al. | 360/105 |
| 5,031,061 | 7/1991 | Hatch | 360/98.08 |

FOREIGN PATENT DOCUMENTS

| | | | |
|---|---|---|---|
| 0200971 | 12/1982 | Japan | 360/105 |
| 0103485 | 5/1988 | Japan | 360/99.12 |

Primary Examiner—A. J. Heinz
Assistant Examiner—David D. Davis
Attorney, Agent, or Firm—E. F. Oberheim

[57] ABSTRACT

Resistance to shock forces having components acting parallel to the spindle axis of a disk stack is provided by spacing the surface of a circumferential flange of a disk spacer a distance above the surface of a disk in the disk stack which is sufficient to clear the magnetic head and flexure assembly therebeneath during movement thereof during flight to and from a parked position between the confronting surfaces of the circumferential flange and the disk.

4 Claims, 3 Drawing Sheets

HEAD LIFT LIMITER FOR A DISK DRIVE

TECHNICAL FIELD

This invention relates generally to disk drives and more particularly to disk drives in which provision is made to minimize head slap damage to the disk surface in the presence of shock forces.

BACKGROUND OF THE INVENTION

In a disk drive the electromagnetic heads are each resiliently mounted on the end of a flexible cantilever arm forming part of a linear or rotary actuator. Each flexible cantilever arm projects between a pair of disks in a disk stack to move the heads in track seeking and track following operations. When the disk drive is not in operation the actuator moves the heads to parked positions. In one parking mode the heads are parked on the disk surface in a head parking zone next to the hub of the disk stack. In another parking mode the actuator removes the armstack and the heads from a position between the disks to a position removed from the disks onto a parking ramp at the edge of disk stack.

The disk drives are designed to withstand the shock forces which are usually encountered in a normal operational environment, but when being handled or moved, shock forces from bumping or dropping, in the absence of suitable restraints or displacement limiters, may result in damaging displacements or deflections of the structural parts and/or collisions of parts.

Prior art restraints in disk drives include actuator limit stops such as crash stops and latches, For limiting extremes of actuator displacements and for securing the actuator in that extreme of displacement in which magnetic heads are parked. U.S. Pat. Nos. 4,538,193; 4,647,997; 4,692,892 and 5,036,416, describes such general types of actuator restraints or locks.

Unlike the patents above, U.S. Pat. No. 4,939,611 assigned to the assignee of this invention, describes a vertical limit stop or crash stop which is disposed between the disks at the peripheral edges whenever the actuator is moved to a position in which the magnetic heads are parked on the disk surfaces adjacent the hub of the disk stack. This vertical limit stop prevents collisions between the individual arm stacks and the adjacent closely spaced disk surfaces in the presence of shock forces having force components paralleling the disk stack axis.

While this type of vertical limit stop is effective in limiting relative movement between the disks and the arm stack structure to obviate arm stack disk collisions it does not limit magnetic head displacements.

None of the limit stops described in the referenced patents address the matter of head/disk collisions.

SUMMARY OF THE INVENTION

The present invention is directed specifically to the prevention of head/disk collisions in a disk drive in which the magnetic heads are parked in a landing/parking zone adjacent the hub of the disk stack. The magnetic heads are attached to the ends of the flexible cantilever load beams by means of thin resilient metal strips, called flexures, which function as gimble mounts providing spring loaded roll and pitch mobility, directional stability, and spring loading normal to the disk surface to lightly spring load each head against the surface of the disk. In operation the head slider flies on the air bearing moving with the disk surface. A lack of displacement restraint of the magnetic heads, at least in the direction normal to the surfaces of the disks, can result in the head slider becoming displaced from the disk surface in the presence of shock forces. When the head slider returns to the disk surface, the impact of the head slider to the disk can result in damage to the disk surface and/or the magnetic head. Flexure and load beam damage also may be involved.

The load beams and the magnetic heads are usually supported by the actuator structure in back-to-back pairs between the disks. When the heads are parked, the head slider faces confront and engage the opposing faces of the adjacent disks. The disks are assembled in a stack with spacers therebetween. A circumferential flange on each spacer projects between the confronting back sides of the magnetic heads and the load beams, in a plane parallel to the disk surfaces, with a slight clearance to permit flying height clearance for the heads in preparation for operation of the disk drive.

BRIEF DESCRIPTION OF THE DRAWINGS

The invention may be better understood by reference to the following specification when considered in conjunction with the accompanying drawings in which.

DESCRIPTION OF THE PREFERRED EMBODIMENT

Figure 1:
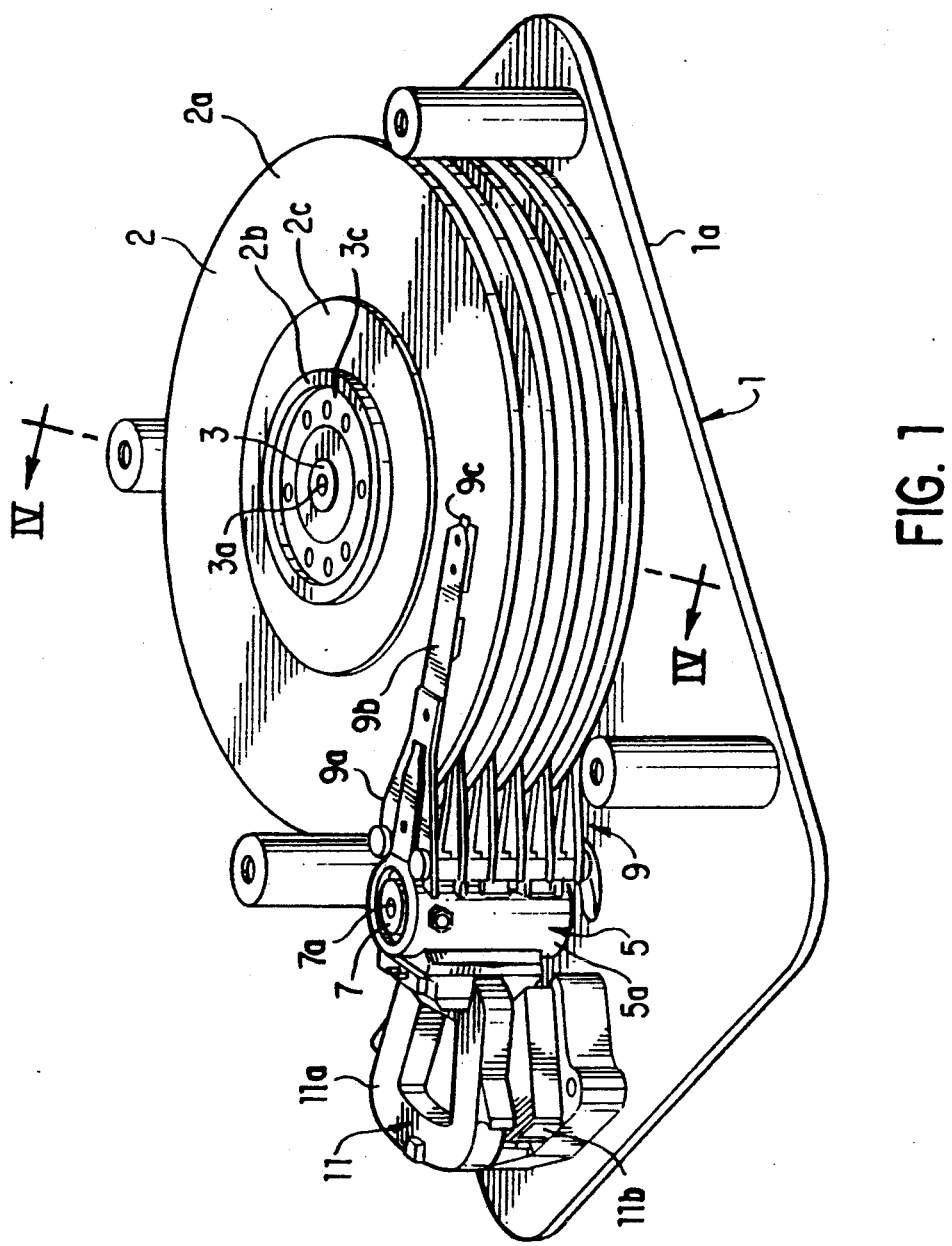
FIG. 1 is an isometric view of a disk drive, with the cover removed, embodying the head lift limiter of this invention.
Figure 2:
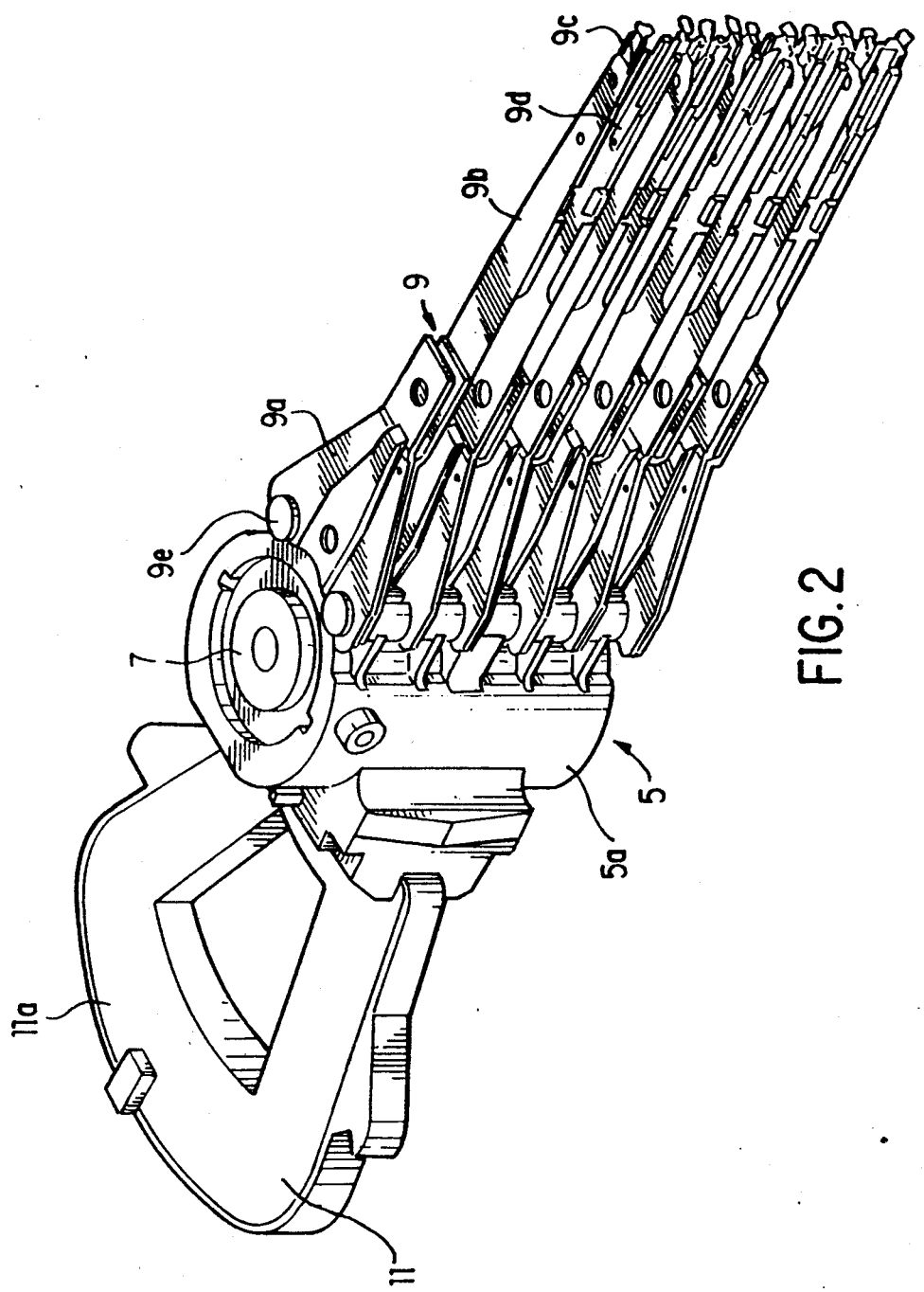
FIG. 2 is an enlarged isometric of the rotary actuator of FIG. 1.
Figure 3:
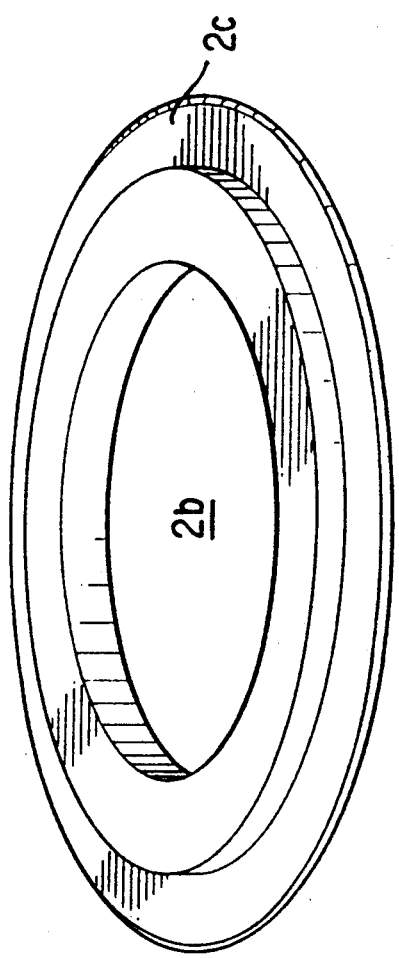
FIG. 3 is an isometric view of a disk spacer having a circumferential flange according to this invention.
Figure 4:
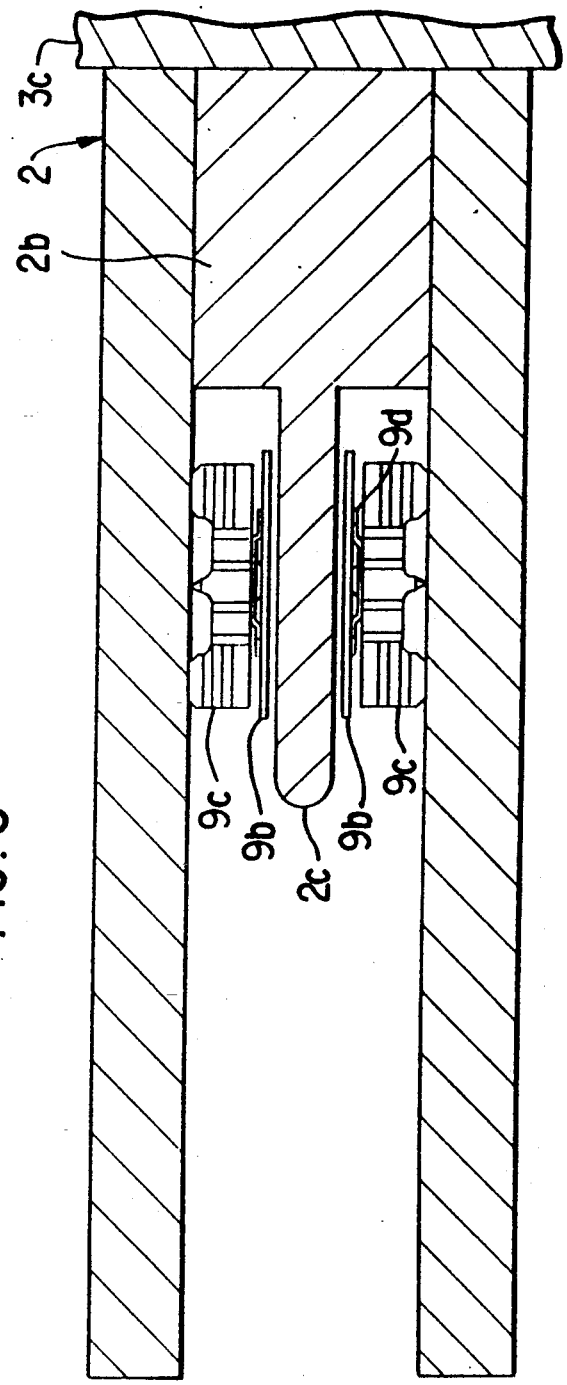
FIG. 4 is a cross sectional view taken in the plane of the section line IV—IV of FIG. 1.

FIGS. 1 through 4 illustrate the presently known best mode for practicing invention. As seen in FIG. 1, the disk drive 1 comprises a support plate 1a on which a disk stack 2 is rotatable mounted. The disk stack 2 comprises a stack of individual disks 2a having spacers 2b disposed therebetween. Each such spacer is provided with a circumferential flange 2c which, as seen in FIG. 4, is preferably axially centered between the opposite faces of the disks and projects between the disks. This disk stack is assembled upon a hub 3c which is journaled upon a spindle 3 secured to the support plate 1a, for rotation about the axis 3a of the spindle 3.

A rotary actuator 5 comprises an actuator bearing housing 5a which is journaled about a spindle 7 which is also secured to the base plate 1a. The bearing housing rotates about the axis 7a of the spindle 7. An armstack structure generally designated 9, FIG. 2, comprises individual arm structures which project between the respective adjacent disks. Each arm structure comprises a pair of arms 9a disposed in back-to-back relationship. Load beams 9b are attached to the ends of these arms also in back-to-back positions and magnetic heads 9c are attached to the ends of these load beams by flexures 9d which are thin strips of resilient metal providing spring loaded roll and pitch movement of the magnetic heads while providing directional stability. The flexures and the load beams lightly spring load each of the magnetic heads against adjacent surfaces of the respective disks.

The rotary actuator is driven by a voice coil motor 11 which comprises a coil 11a which sweeps between permanent magnets 11b, only one being shown in the interest of simplicity.

As seen in FIG. 4, which is a sectional view taken in the plane of the section line IV of FIG. 1, the magnetic heads 9c are seated upon the respective disks 2 in parked position. The circumferential flange 2c of the spacer 2b extends between the magnetic heads in a position slightly clearing the flexures 9b. This clearance is sufficient to permit the magnetic heads to take off and fly on the air bearing clinging to and moving with the surface of each of the disks as the disks are brought up to speed in preparation for operation of the disk drive. The clearance is such that when the heads are in full flight at this location there is no contact of the heads or the flexures with the adjacent surfaces of the circumferential flange 2c. When the disk drive is in operation and functioning to provide information as requested by a host computer the magnetic heads 9c are removed completely from their illustrated positions between the adjacent faces of a disk 2a and the circumferential flange 2c without physical interference by contact with any part of adjacent flange surfaces.

When in parked position this head limiter limits the displacement of the magnetic head 9c from the disk surface in the presence of mechanical shock having an acceleration force component normal to the surface of the disk that is, paralleling the rotational axis of the disk stack. Thus impact velocity between the magnetic heads and circumferential flange 2c and between the magnetic heads and the adjacent surface of the disk is significantly reduced with respect to that which would exist if the heads were not limited in displacement. As a result, this head lift limiter eliminates or minimizes the effect of head slap damage to the disk surface to the heads and to the head mounts. The head lift limiter provides disk drive head slap protection during shipping and handling when the actuator is latched and the heads are parked in the landing zone.

This head lift limiter provides the following advantages:

1. The limiter increases the robustness of the disk drive with respect to shipping and handling in that it increases its tolerance to shock forces. Disk drives can therefore be subject to higher shipping and handling shock forces without the likelihood of severe head and disk surface damage due to head slap.

2. The spring loading of the magnetic head suspension can be reduced. This lowers the stiction and friction forces which is desirable.

3. Ramp loading and unloading of heads is not required. Lower actuator power consumption therefore results because there are no ramp friction loads to overcome. There is no need for extra vertical spacing between the disks which is usually required when ramps are employed for loading and unloading of the magnetic heads. Similarly, extra space outside the disk stack for the ramp structure is not required. The reduction in stiction and friction forces also reduces actuator and/or disk power requirements.

4. The use of the head lift limiter of this invention provides flexibility in head suspension design and slider design with respect to head slap in terms of gram load on the head provided by this spring suspension, the mass of the suspension, and the slider mass.

Although the invention has been described with some particularity with respect to the use of a circumferential flange centrally axially spaced between adjacent disks in the disk stack it will be seen from an inspection of FIG. 1 that the same head lift principles are applicable to the magnetic head which is on the top surface of the top disk 2a. In FIG. 1, the bottom surface of the circumferential flange 2c is spaced above the top surface of the top disk 2a a distance sufficient to clear the magnetic head 9c, adjacent the top surface of the top disk, there beneath when the armstack structure moves the heads to their parked positions. Similar considerations apply to the magnetic head lift limiter structure adjacent the bottom surface of the bottom disk 2a in the disk stack.

The invention has been described in connection with a specific configuration and type of the actuator structure. It is evident that either a linear or a rotary actuator is useable in practicing this invention. Likewise a voice coil type of drive is not essential to this invention. Other types of motors including stepper motors or hybrid drives may be employed. The details of the armstack structure per se are not limiting with respect to this invention. Although the spacers 2b and the circumferential flanges 2c in the disk stack structure are shown as an integral fabrication it is evident that the three separate rings may comprise this assembly in assembled positions about the hub 3c of the disk stack itself. These and other modifications of this invention may be practiced by those skilled in the art without departing from the spirit and the scope of this invention.

What is claimed is:

1. A disk drive comprising:
   a. a support structure;
   b. at least one disk, having a hub;
   c. means rotatably supporting said hub of said disk on said support structure;
   d. a transducer slider;
   e. a movable actuator having an arm structure for resiliently supporting said transducer slider adjacent a surface of said disk to fly on the air bearing thereat and for moving said transducer slider substantially radially of said disk to a parked position on the surface of said disk adjacent said hub
   f. an annular member concentrically disposed on said disk;
   g. a circumferential flange on said annular member having a surface substantially paralleling and spaced from a surface of said disk a distance to clear said transducer slider while said transducer slider is flying on said air bearing and, for limiting displacement of said transducer slider from said disk surface.

2. The invention according to claim 1, comprising:
   a. a second disk concentrically disposed of said one disk; on said annular member and having a surface confronting said surface of said one disk;
   b. said circumferential flange being substantially centrally disposed between said one disk and said second disk and having a surface confronting said surface of said second disk;
   c. a second transducer slider;
   d. a second arm structure on said actuator for resiliently supporting said second transducer slider adjacent said surface of said second disk to fly on the air bearing thereat and for moving said second transducer slider substantially radially of said second disk to a parked position thereon adjacent said hub between said second disk and said circumferential flange;
   e. said surface of said circumferential flange confronting said surface of said second disk being spaced to clear said second transducer slider while said second transducer slider is flying on said air bearing and to limit displacement of said second transducer slider from said surface of said second disk.

3. The invention according to claim 1, in which:
said surface of said circumferential flange limits displacement of said transducer slider from the surface of the disk to a distance substantially twice the flying height of the transducer slider.

4. The invention according to claim 2, in which:
said surface of said circumferential flange adjacent said second disk limits displacement of said second transducer slider from the surface of the second disk to a distance substantially twice the flying height of said second transducer slider.

* * * * *